UNITED STATES PATENT OFFICE.

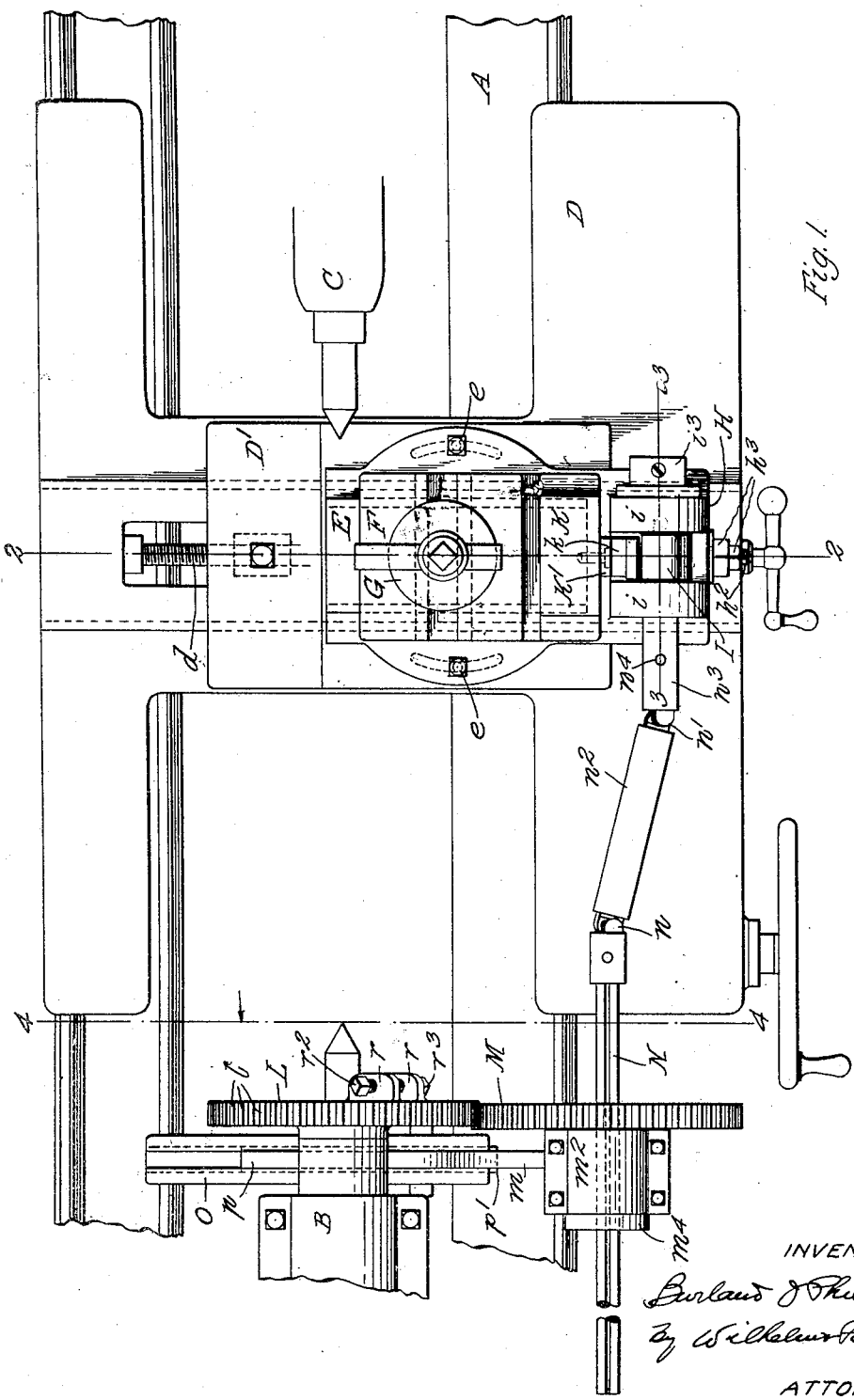

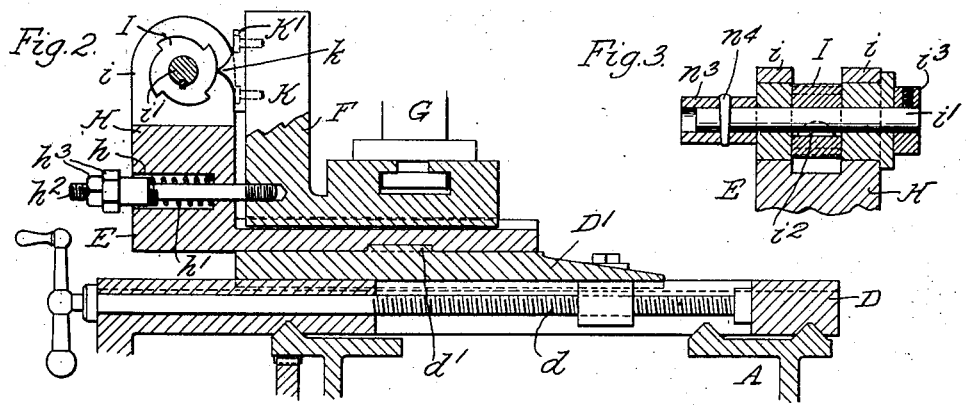

BURLAND J. PHILLIPS, OF BUFFALO, NEW YORK.

RELIEVING ATTACHMENT FOR LATHES OR THE LIKE.

1,350,735.            Specification of Letters Patent.      Patented Aug. 24, 1920.

Application filed March 26, 1919. Serial No. 285,319.

*To all whom it may concern:*

Be it known that I, BURLAND J. PHILLIPS, a citizen of the United States, residing at Buffalo, in the county of Erie and State of New York, have invented a new and useful Improvement in Relieving Attachments for Lathes or the like, of which the following is a specification.

This invention relates to relieving or backing-off attachments for lathes or similar machines.

The objects of the invention are to provide a relieving attachment of this kind which can be readily applied to or removed from any lathe without requiring any changes in the lathe; also to provide a mechanism of this kind which is driven directly from the spindle of the lathe; also to provide a mechanism of this kind with means of improved construction for changing the speed of the relieving attachment relatively to the lathe spindle; also to provide means of improved construction for transmitting movement from the cam to the tool carriage whereby rotation of the cam in the reverse direction will cause no injury thereto; also to provide the face plate with means which facilitate the accurate positioning of the work relatively to the cutting tool; also to improve the construction of devices of this kind in other respects hereinafter specified.

In the accompanying drawings:

Figure 1 is a fragmentary top plan view of a lathe having a relieving attachment embodying the invention attached thereto.

Fig. 2 is a fragmentary transverse sectional elevation thereof on line 2—2, Fig. 1.

Fig. 3 is a fragmentary transverse sectional elevation thereof on line 3—3, Fig. 1.

Fig. 4 is a transverse sectional elevation thereof on line 4—4, Fig. 1.

Fig. 5 is a fragmentary longitudinal sectional elevation thereof showing a lathe dog in operative position with regard to the adjusting mechanism.

Fig. 6 is a longitudinal front elevation thereof.

The relieving attachment may be attached to any desired type of lathe, the lathe shown in the drawings including the usual bed A, headstock B, tailstock C, and tool carriage D, slidable lengthwise of the lathe bed. D' represents the carriage cross slide which may be actuated by the usual feed screw $d$. The other parts usually mounted on the carriage cross slide of any lathe are not used when the relieving attachment is employed and are removed from the carriage cross slide before attaching the relieving attachment.

The parts of the relieving attachment which are to be secured on the carriage cross slide include a tool slide base E and a tool slide F which moves relatively to the tool slide base E to effect the relieving or backing-off. G represents the usual tool post which is secured to the tool slide in any desired or usual manner. The tool slide base is preferably adjustable relatively to the tool carriage cross slide about the axis of a centering pin or post $d'$ of the carriage cross slide D' to present the tool to the work in various angular relations. The tool slide base may be secured in the desired angular relation to the carriage cross slide D' by means of the usual set screws or the like $e$.

The tool slide base is preferably provided at its front end with an upwardly extending portion H and in order to yieldingly draw the tool slide toward the front of the machine, the tool slide base, in the construction shown, is provided with a hole or depression $h$ in which a spring $h'$ is arranged which acts upon a bolt $h^2$ through the medium of nuts $h^3$ or the like. The bolt $h^2$ is secured to the tool slide F, so that the spring acting on the bolt draws the tool slide toward the front portion of the tool slide base E. Any other means for yieldingly drawing the tool slide toward the front of the tool slide base may be employed.

The upper portion of the projection H is provided with bearing lugs or projections $i$ between which a cam I is arranged. The cam is secured to a cam shaft $i'$ which is journaled in the projections or lugs $i$, preferably by means of a key $i^2$, and a collar $i^3$ is secured to the end of the cam shaft in the construction shown, to hold the shaft in proper relation to the lugs or projections $i$. The collar $i^3$ is preferably readily removable from the shaft $i$ so that in case it is desired to replace the cam I by another cam, the collar $i^3$ can be removed to permit the shaft $i$ to be withdrawn from the cam I. Any other means for releasably holding the cam shaft in its operative position may be employed.

The cam I by its rotation is adapted to impart motion to the tool slide F to effect the relieving or backing-off movement of the cutting tool. For this purpose the tool slide is also provided with an upwardly extending portion K having a bearing plate K' secured thereto. This bearing plate has a projection $k$ which is adapted to be engaged by the cam I to impart movement to the tool slide. The projection $k$ is preferably made with gradually tapering or inclined sides which are so formed that the movement of the cam I in the reverse direction will not injure the projection $k$ nor the cam I, but will cause the teeth of the cam to engage the inclined faces of the projection $k$ and move the tool slide rearwardly. The inclined sides of the projection $k$ also have the advantage of permitting the projection to ride gradually over the ends of the cam faces, so that the operation of the cam and tool slide is noiseless. The plate K' and the cam I are preferably hardened so that the relative movement of these two parts will not cause wearing of the same.

The means for imparting rotary movement to the cam I are preferably constructed as follows:

The face plate which is usually arranged on the headstock of the lathe is removed when the relieving attachment is applied to the lathe, and is replaced by a face plate L which is provided with gear teeth $l$ which may be formed integral with the face plate L or which may form part of a gear rigidly secured thereto. The teeth of the face plate L mesh with a gear M which is suitably journaled on a bracket $m$ removably secured on the lathe bed. The gear M drives a shaft N which is movable lengthwise relatively to the gear. In the construction shown, the gear M is keyed to a sleeve or rotary bushing $m'$ which is rotatable in a bearing $m^2$ formed in the upper end of the arm $m$. The bushing is splined to the shaft N, which is freely movable lengthwise of the bushing $m'$, a key $m^3$ being rigidly secured to the bushing $m'$ and slidably engaging in a key-way extending substantially throughout the length of the shaft. The bushing $m'$ may be held against movement lengthwise of the bearing $m^2$ by any suitable means, such as a collar $m^4$ or the like. The shaft N may be connected with the cam shaft $i'$ in any suitable manner, a pair of universal joints $n$ $n'$ connected by a short intermediate shaft $n^2$ being preferably provided so that the distance between the centers of the shafts N and $i'$ may be varied as desired. The universal joint $n'$ terminates in a shell or sleeve $n^3$ which is secured to the cam shaft $i'$ by means of a pin $n^4$ or other suitable means. The shaft N may be made of any desired length and by means of this construction no hollow or telescopic shaft is necessary.

In order to support the arm $m$ and the gear mounted thereon from the bed of the lathe in such a manner as to avoid the necessity of making any changes on the lathe for attaching the relieving mechanism thereto, the following construction is preferably employed:

O represents a removable base or part which may be secured to the lathe bed by any suitable means, such as a clamp consisting of a bar or member $o$ and screws $o'$. The base O is preferably provided with a notched portion $o^2$ adapted to engage a guide rail of the lathe bed. By means of this construction the base or part O may be secured to lathes of different makes. The arm $m$ is secured to the base O so as to permit the same to be adjusted in a direction transversely of the lathe bed so as to make it possible to use gears of different diameters in place of the gear M, for varying the speed of rotation of the cam I. The base O is preferably provided with an upright groove or slot in which an extension $p$ of the arm $m$ is slidably arranged, the lower end of the groove being preferably enlarged to receive an enlarged portion $p'$ of the extension $p$. The arm $m$ may be clamped in any desired position relative to the base O by means of a bolt $p^2$ extending through the extension $p$ of the arm $m$ and slots $p^3$ in the base O. By tightening the bolt the arm may be clamped in any desired position relatively to the base O, thus permitting gears of different diameters to replace the gear M. Means of other construction for securing the gear M in operative relation to the face plate gear may be provided.

The work to be operated upon is preferably held by means of the usual lathe dogs, and in order to accurately position the work relatively to the cutting tool, means are preferably employed for adjusting the position of the lathe dogs. For this purpose the face plate L is provided with two lugs $r$ $r'$ which are provided with threaded holes in which two set screws $r^2$ $r^3$ are arranged. The set screws are so positioned relatively to each other that the end of a lathe dog $s$ may be held between the inner ends of the two set screws. By adjusting the two set screws relatively to the lugs $r$ $r'$, an accurate positioning of the lathe dog and the work held thereby may be effected.

The relieving mechanism described has the advantage of being applicable to lathes of different makes without requiring any changes on the lathe. The driving mechanism for the relieving attachment may be secured to the bed of the lathe without necessitating any machining or other changes of the lathe and the tool slide base and parts mounted thereon can be readily mounted on the tool carriage cross slide D' in place of the tool slide base usually employed. By providing a cam which bears directly against a hardened steel plate mounted on the tool slide, the lost motion which usually occurs in using a roller or pin engaging with the cam is eliminated, and greater accuracy of the mechanism is provided. By means of the adjusting mechanism for the lathe dog, the work can be very accurately positioned relatively to the cutting tool.

I claim as my invention:

1. In a relieving attachment for a lathe, the combination with a face plate, of a slide base member, a slide member movable relatively to said base member, a cam on one of said members, and means for driving said cam from said face plate to cause said slide member to move relatively to said slide base member.

2. In a relieving attachment for a lathe, the combination with a face plate, of a slide base member, a slide member movable relatively to said base member, a cam on one of said members, and a gear movable with said face plate, said gear imparting rotation to said cam to cause said slide member to move relatively to said slide base member.

3. In a relieving attachment for lathes, the combination with a face plate and a tool carriage, of a slide base member mounted on said tool carriage, a slide member movably mounted on said slide base member, a cam rotatably arranged on one of said members and adapted to impart motion to said slide member, a gear on said face plate, and connections between said gear and said cam for driving said cam.

4. In a relieving attachment for lathes, the combination with a face plate and a tool carriage, of a slide base member mounted on said tool carriage, a slide member movably mounted on said slide base member, a cam rotatably arranged on one of said members and adapted to impart motion to said slide member, a gear on said face plate, a second gear meshing with said face plate gear, said second gear being adapted to be replaced by gears of different sizes, and connections between said second gear and said cam.

5. In a relieving attachment for lathes, the combination with a face plate and a tool carriage, of a slide base member mounted on said tool carriage, a slide member movably mounted on said slide base member, a cam rotatably arranged on one of said members and adapted to impart motion to said slide member, a gear on said face plate, a second gear meshing with said face plate gear, and a shaft connecting said second gear and said cam, said shaft being movable lengthwise relatively to said second gear to permit said tool carriage to be moved lengthwise of the lathe bed.

6. In a relieving attachment for lathes, the combination with a face plate and a tool carriage, of a slide base member mounted on said tool carriage, a slide member movably mounted on said slide base member, a cam rotatably arranged on one of said members and adapted to impart motion to said slide member, a gear on said face plate, a second gear meshing with said face plate gear, a shaft connecting said second gear and said cam, and universal joints in said shaft.

7. In a relieving attachment for a lathe, the combination with a face plate, of a slide base member, a slide member movable relatively to said base member, a cam on one of said members, and means removably secured on the bed of the lathe for driving said cam from said face plate.

8. In a relieving attachment for lathes, the combination with the bed and the tool carriage of a lathe, of a tool slide base having parts of a relieving mechanism and a cutting tool mounted thereon, said tool slide base being adapted to be positioned on said tool carriage, and means for driving said relieving mechanism which is detachably clamped on said lathe bed whereby said relieving attachment may be secured to a lathe without requiring any changes in the lathe.

9. In a relieving attachment for lathes, the combination with the bed and the tool carriage of a lathe, of a tool slide base having parts of a relieving mechanism and a cutting tool mounted thereon, said slide base being adapted to be operatively mounted on said tool carriage, a face plate, and a driving connection between said face plate and said relieving mechanism.

10. In a relieving attachment for lathes, the combination with the bed and the tool carriage of a lathe, of a tool slide base having parts of a relieving mechanism and a cutting tool mounted thereon, said tool slide base being adapted to be operatively mounted on said tool carriage, a face plate, driving means connecting said face plate with said relieving mechanism, and means for releasably mounting said driving means on said lathe.

11. In a relieving attachment for lathes, the combination with the bed and the tool carriage of a lathe, of a tool slide base having parts of a relieving mechanism and a cutting tool mounted thereon, said tool slide base being adapted to be operatively mounted on said tool carriage, and means adapted to be removably clamped on the bed of said lathe to actuate said relieving mechanism.

12. In a relieving attachment for lathes, the combination with the bed and the tool carriage of a lathe, of a tool slide base having parts of a relieving mechanism and a cutting tool mounted thereon, said tool slide base being adapted to be operatively mounted on said tool carriage, driving mechanism for said relieving mechanism adapted to derive power from the headstock of the lathe, and means for releasably clamping said driving mechanism to the lathe bed.

13. In a relieving attachment for lathes, the combination with the bed and the tool carriage of a lathe, of a tool slide base having parts of a relieving mechansm and a cutting tool mounted thereon, said tool slide base being adapted to be operatively mounted on said tool carriage, driving mechanism for said relieving mechanism adapted to derive power from the headstock of the lathe, means adapted to be clamped to the lathe bed for supporting said driving mechanism, and a device for adjusting said driving mechanism relatively to said clamping means.

14. In a relieving attachment for lathes, the combination with the bed and the tool carriage of a lathe, of a tool slide base having parts of a relieving mechanism and a cutting tool mounted thereon, said tool slide base being adapted to be operatively mounted on said tool carriage, a driving mechanism for operating said relieving mechanism, a base adapted to be removably secured to the lathe bed, and a supporting member for said driving mechanism which is adjustably mounted on said base.

15. In a relieving attachment for lathes, the combination with the bed and the tool carriage of a lathe, of a tool slide base having parts of a relieving mechanism and a cutting tool mounted thereon, said tool slide base being adapted to be operatively mounted on said tool carriage, driving mechanism for operating said relieving mechanism, a base adapted to be removably secured to said lathe bed and having a guide slot, and an arm supporting said driving mechanism and adjustably secured in said slot.

16. In a relieving attachment for lathes, the combination with the bed and the tool carriage of a lathe, of a tool slide base having parts of a relieving mechanism and a cutting tool mounted thereon, said tool slide base being adapted to be operatively mounted on said tool carriage, a face plate having gear teeth operatively connected therewith, a gear meshing with said gear teeth, a driving connection between said gear and said relieving mechanism for imparting movement thereto, and an arm mounted on said lathe bed and on which said gear is journaled and which is adjustable toward and from the axis of said face plate.

17. In a relieving attachment for lathes, the combination of a slide base member, a slide member movable relatively to said base member, a cam on one of said members, and part on said other member having a plate secured thereto provided with a hardened metal tip bearing on said cam, said tip having gradually inclined faces whereby the cam may rotate in either direction without injury to said tip.

18. In a relieving attachment for lathes, the combination of a slide base member having an upwardly extending portion, a slide member movable relatively to said base member and having an upwardly extending portion arranged in operative relation to said upwardly extending portion of said base member, a cam journaled on one of said upwardly extending portions, and a hardened metal plate secured to the other upwardly extending portion and having a tip extending into engagement with said cam whereby said slide member is moved relatively to said base member when said cam is rotated.

19. In a relieving attachment for lathes, the combination with the bed and the tool carriage of a lathe, of a tool slide base having a cutting tool mounted thereon, a cam rotatably mounted on the tool carriage and adapted to actuate said tool slide base, said cam being removably mounted and adapted to be replaced by other cams, a driving gear on the face plate of said lathe, a gear driven by said driving gear and which is adapted to be replaced by other gears, and a shaft connecting said driven gear directly with said cam.

20. In a lathe, the combination with a cutting tool and means for supporting the work, a rotary face plate, a part secured to the work and extending into proximity to said face plate, and means on said face plate adapted to engage said part for rotating the work, said means being adjustable to vary the position of the work relatively to the cutting tool.

21. In a lathe, the combination with a cutting tool and means for supporting the work, a rotary face plate, a part secured to the work and extending into proximity to said face plate, and a set screw on said face plate adapted to engage said part for rotating the work and which is adjustable for varying the position of the work relatively to said cutting tool.

22. In a lathe, the combination with a cutting tool and means for supporting the work, a rotary face plate, a lathe dog adapted to be secured to the work and having a part extending into proximity to said face plate, and a pair of oppositely disposed set screws on said face plate and between which said part of the lathe dog is adapted to be held, said set screws being adjustable to vary the position of the work with regard to the cutting tool.

Witness my hand, this 24th day of March, 1919.

BURLAND J. PHILLIPS.

Witnesses:
WM. H. JACOBS,
E. A. HARRIS.